US009813360B2

(12) United States Patent
Lu

(10) Patent No.: US 9,813,360 B2
(45) Date of Patent: *Nov. 7, 2017

(54) SWITCH BOARD OF BLADE SERVER AND PORT CONFIGURING METHOD THEREOF

(71) Applicant: Huawei Technologies Co., Ltd., Shenzhen (CN)

(72) Inventor: Shengwen Lu, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/590,724

(22) Filed: May 9, 2017

(65) Prior Publication Data

US 2017/0250928 A1    Aug. 31, 2017

Related U.S. Application Data

(63) Continuation of application No. 14/579,047, filed on Dec. 22, 2014, now Pat. No. 9,698,462, which is a continuation of application No. PCT/CN2012/077301, filed on Jun. 21, 2012.

(51) Int. Cl.
| | |
|---|---|
| *H04L 12/931* | (2013.01) |
| *H01P 1/15* | (2006.01) |
| *H01P 1/12* | (2006.01) |
| *H01P 5/12* | (2006.01) |

(Continued)

(52) U.S. Cl.
CPC .......... *H04L 49/352* (2013.01); *G06F 9/4411* (2013.01); *H01H 59/0009* (2013.01); *H01P 1/127* (2013.01); *H01P 1/15* (2013.01); *H01P 5/12* (2013.01); *H04L 49/70* (2013.01)

(58) Field of Classification Search
None
See application file for complete search history.

(56) References Cited

U.S. PATENT DOCUMENTS

2009/0327392 A1    12/2009  Tripathi et al.
2011/0243146 A1    10/2011  Armstrong et al.

FOREIGN PATENT DOCUMENTS

| CN | 1622530 A | 6/2005 |
| CN | 101291258 A | 10/2008 |
| CN | 101895444 A | 11/2010 |

(Continued)

OTHER PUBLICATIONS

Machine Translation and Abstract of Chinese Publication No. CN201682515, Feb. 27, 2015, 6 pages.

(Continued)

*Primary Examiner* — Kwang B Yao
*Assistant Examiner* — Adam Duda
(74) *Attorney, Agent, or Firm* — Conley Rose, P.C.

(57) ABSTRACT

A switch board that includes a port configuring unit and a plurality of ports, where the port configuring unit is configured to divide the switch board into more than one virtual sub-switch-board, allocate the ports to the virtual sub-switch-boards, and configure each port of each virtual sub-switch-board to a first-type port or a second-type port, where the first-type port and the second-type port have different bandwidth; and each of the ports is configured to connect a server blade according to a configuration on the port configuring unit. The technical solutions of the present disclosure can meet a requirement for flexible port bandwidth configuration.

19 Claims, 2 Drawing Sheets

(51) Int. Cl.
*H01H 59/00* (2006.01)
*G06F 9/44* (2006.01)

(56) References Cited

FOREIGN PATENT DOCUMENTS

CN 201682515 U 12/2010
WO 2009146165 A1 12/2009

OTHER PUBLICATIONS

Machine Translation and Abstract of Chinese Publication No. CN101291258, Oct. 22, 2008, 14 pages.
Machine Translation and Abstract of Chinese Publication No. CN101895444, Nov. 24, 2010, 9 pages.
Foreign Communication From a Counterpart Application. European Application No. 12879295.9, Extended European Search Report dated Apr. 29, 2015, 5 pages.
Foreign Communication From a Counterpart Application. Chinese Application No. 201280000538.1, Chinese Office Action dated Jun. 27, 2014, 6 pages.
Foreign Communication From a Counterpart Application. PCT Application No. PCT/CN2012/077301, International Search Report dated Mar. 28, 2013, 2 pages.
Foreign Communication From a Counterpart Application. PCT Application No. PCT/CN2012/077301, Written Opinion dated Mar. 28, 2013, 5 pages.

SWITCH BOARD OF BLADE SERVER AND PORT CONFIGURING METHOD THEREOF

CROSS-REFERENCE TO RELATED APPLICATIONS

This application is a continuation of U.S. patent application Ser. No. 14/579,047, filed on Dec. 22, 2014, which is a continuation of International Application No. PCT/CN2012/077301, filed on Jun. 21, 2012. All of the afore-mentioned patent applications are hereby incorporated by reference in their entireties.

TECHNICAL FIELD

Embodiments of the present disclosure relate to the field of data network technologies, and in particular, to a switch board of a blade server and a port configuring method thereof.

BACKGROUND

An Ethernet technology is currently a major data network technology, and mainly applies to networks of two bandwidth types: 10 gigabits per second (Gbps) and 40 Gbps. A blade server is a type of server commonly used in the Ethernet, and the blade server mainly includes two parts: a server blade connected to a user equipment and a switch board connected to a network device, where multiple ports are disposed on the switch board to connect the server blade.

According to different supported bandwidth, the ports of the switch board may also be classified into a type of port supporting 10 Gbps and a type of port supporting 40 Gbps, and correspondingly the ports of the switch board are separately set as 10 Gigabit Ethernet (GE) ports and 40 GE ports. During use of the blade server, a network adapter is fastened onto the server blade, and the server blade is connected to a port on the switch board, so as to implement network connectivity.

However, each port on the switch board in the prior art can only be configured to a port of one bandwidth type; if the bandwidth type is changed, the entire switch board needs to be restarted. As a result, a normal service function of the switch board is affected, and consequently a requirement for flexible bandwidth configuration cannot be met.

SUMMARY

Embodiments of the present disclosure provide a switch board of a blade server, a port configuring method thereof, and a blade server, which are used to meet a requirement for flexible port bandwidth configuration.

A first aspect of the embodiments of the present disclosure provides a switch board of a blade server, where the switch board includes a port configuring unit and at least one port, where the port configuring unit is configured to divide the switch board into more than one virtual sub-switch-board, allocate the port to the virtual sub-switch-boards, and configure each port of each virtual sub-switch-board to a first-type port or a second-type port, where the first-type port and the second-type port have different bandwidth; and the port is configured to connect a server blade according to a configuration on the port configuring unit.

Another aspect of the embodiments of the present disclosure provides a port configuring method of a switch board of a blade server, including dividing the switch board into more than one virtual sub-switch-board, and allocating a port to the virtual sub-switch-boards; and configuring each port of each virtual sub-switch-board to a first-type port or a second-type port, where the first-type port and the second-type port have different bandwidth.

Still another aspect of the embodiments of the present disclosure provides a blade server, including more than one server blade and the foregoing switch board of a blade server, where the server blade is connected to a corresponding virtual sub-switch-board on the switch board.

In the embodiments of the present disclosure, a switch board includes a port configuring unit, where the port configuring unit can divide the switch board into more than one virtual sub-switch-board, and configure each port of the virtual sub-switch-boards to a first-type port or a second-type port within a range of the virtual sub-switch-boards according to a port corresponding to a specific slot of a server blade, where the first-type port and the second-type port have different bandwidth. Therefore, the switch board in a blade server can perform port configuration according to an actual requirement, so that the switch board has multiple types of ports. Because the port configuration is performed only within a virtual sub-switch-board and the configuration can take effect without a reset operation on the entire switch board, normal use of a port in another virtual sub-switch-board is not affected, and a requirement for flexible bandwidth configuration is met.

BRIEF DESCRIPTION OF DRAWINGS

To describe the technical solutions in the embodiments of the present disclosure more clearly, the following briefly introduces the accompanying drawings used in describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are a part rather than all of the embodiments of the present disclosure. All other embodiments obtained by persons of ordinary skill in the art based on the embodiments of the present disclosure without creative efforts shall fall within the protection scope of the present disclosure.

Figure 1:
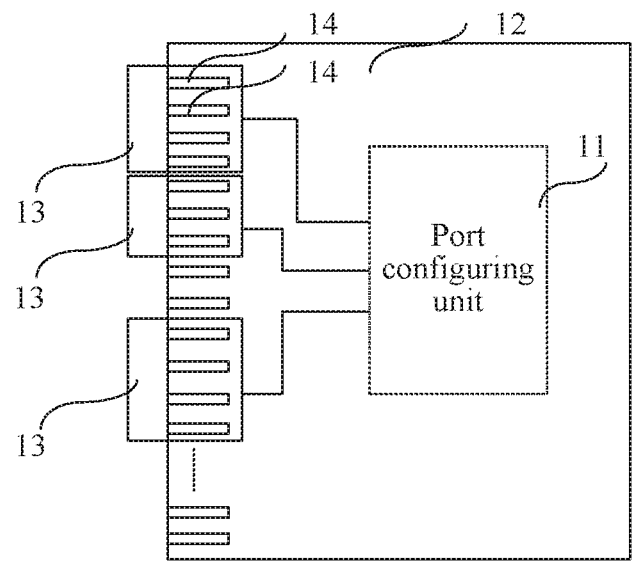
FIG. 1 is a schematic structural diagram of a switch board of a blade server according to an embodiment of the present disclosure.

Each port on a switch board of a blade server in the prior art supports only one bandwidth type; if the bandwidth type is changed, the entire switch board needs to be restarted. As a result, a normal service function of the switch board is affected, and consequently a requirement for flexible configuration cannot be met. In view of this problem, an embodiment of the present disclosure provides a switch board 12 of a blade server. FIG. 1 is a schematic structural diagram of the switch board 12 of a blade server according to this embodiment of the present disclosure. As shown in FIG. 1, the switch board 12 includes a port configuring unit 11 and at least one port 14. The port configuring unit 11 is configured to divide the switch board 12 into more than one virtual sub-switch-board 13, allocate the port 14 to the virtual sub-switch-boards 13, and configure each port 14 of each virtual sub-switch-board 13 to a first-type port or a second-type port, where the first-type port and the second-type port have different bandwidth; the port 14 is configured to connect a server blade according to a configuration on the port configuring unit 11.

In this embodiment of the present disclosure, a switch board includes a port configuring unit, where the port configuring unit can divide the switch board into more than one virtual sub-switch-board, and configure each port of the virtual sub-switch-boards to a first-type port or a second-type port within a range of the virtual sub-switch-boards according to a port type requirement corresponding to a specific slot of a server blade, where the first-type port and the second-type port have different bandwidth. Therefore, the switch board in a blade server can perform port configuration according to an actual requirement, so that the switch board has multiple types of ports. Because the port configuration is performed only within a virtual sub-switch-board and a reset operation on the entire switch board is not needed, normal use of a port in another virtual sub-switch-board is not affected, and a requirement for flexible bandwidth configuration is met.

Preferably, in the foregoing embodiment, the port configuring unit is configured to divide the switch board into more than one virtual sub-switch-board, where the number of virtual sub-switch-boards obtained by division is the same as the number of server blades connected to the switch board. Preferably, the first-type port may be a 10GE port, and the second-type port may be a 40GE port.

Further, each type of port configured on the switch board may be identified using a port identifier; the port identifier includes four parts: a port type identifier used for identifying that the port is a first-type port or a second-type port, a switch board slot number used for identifying the switch board, a sub-switch-board sequence number used for identifying the virtual sub-switch-board to which the port belongs, and a port sequence number used for identifying a sequence number of the port in the virtual sub-switch-board. That is, the port identifier is expressed as "Port type identifier Switch board slot number/Sub-switch-board sequence number/Port sequence number". A location and a type of a port are identified using a port identifier; therefore, flexible port bandwidth configuration is implemented, and the location and the type of the port can also be represented conveniently using the port identifier, thereby further facilitating maintenance and management of the switch board.

Preferably, in the foregoing embodiment, the sub-switch-board sequence number, in the port identifier, used for identifying the virtual sub-switch-board to which the port belongs is the same as or corresponds to a slot number of a server blade connected to the virtual sub-switch-board. For example, for slots 1 to 20 of server blades, sub-switch-board sequence numbers of virtual sub-switch-boards corresponding to the server blades may also be set to 1 to 20, where the sub-switch-board sequence number 1 corresponds to the slot number 1, and the sub-switch-board sequence number 2 corresponds to the slot number 2, that is, the sub-switch-board sequence numbers are the same as the slot numbers; or, sub-switch-board sequence numbers of corresponding virtual sub-switch-boards may be set to 101 to 120, where a correspondence exists between a board sequence number of each sub-switch-board and a slot number of a server blade connected to the sub-switch-board, the sub-switch-board sequence number 101 corresponds to the slot number 1, and the sub-switch-board sequence number 110 corresponds to the slot number 10, that is, the sub-switch-board sequence numbers correspond to the slot numbers. In both of the foregoing two implementation manners, a correspondence between a sub-switch-board and a server blade can be indicated conveniently.

Figure 2:
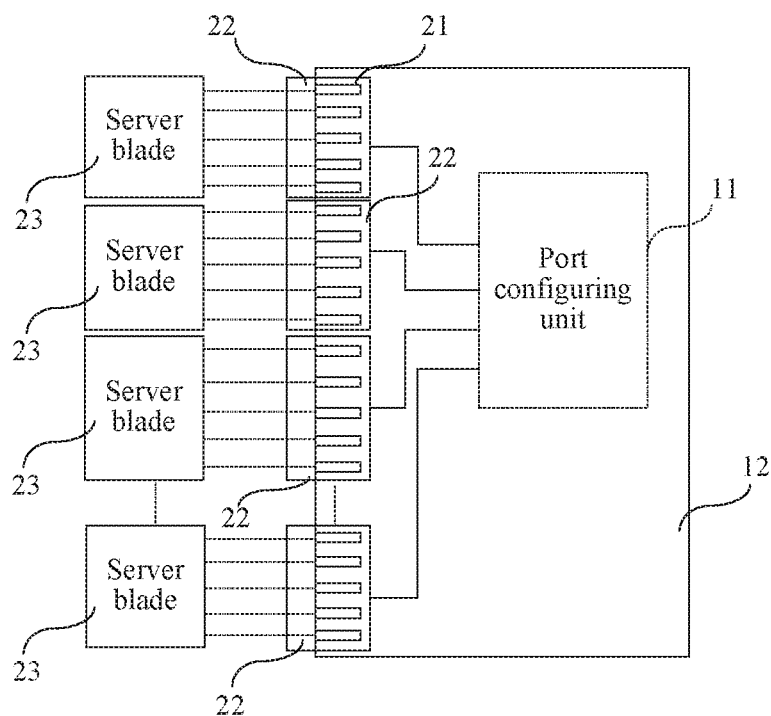
FIG. 2 is a schematic structural diagram of a blade server according to an embodiment of the present disclosure.

An embodiment of the present disclosure further provides a blade server shown in FIG. 2, including more than one server blade and the foregoing switch board of a blade server, where the server blades are connected to ports on the switch board.

As shown in FIG. 2, the switch board 12 has 60 ports 21, and every 5 ports 21 are allocated to one server blade. The port configuring unit 11 may divide the switch board 12 into 12 virtual sub-switch-boards 22, and each virtual sub-switch-board 22 corresponds to one server blade 23. It can be known from the foregoing embodiment that when maximum bandwidth of each port is 10 G, ports on one virtual sub-switch-board may be all configured to 10GE ports. For example, 5 ports on a first virtual sub-switch-board are all configured to 10GE ports, there are totally five 10GE ports, and the five 10GE ports may be represented by 10GE0/0/1 to 10GE0/0/5; 5 ports on a second virtual sub-switch-board are all configured to 10GE ports, there are totally five 10GE ports, and the five 10GE ports may be represented by 10GE0/1/1 to 10GE0/1/5; similarly, if ports on a twelfth virtual sub-switch-board are all configured to 10GE ports, the five ports may be represented by 10GE0/11/1 to 10GE0/11/5. In addition, ports on one virtual sub-switch-board may also be configured to one 40GE port and one 10GE port, where one 40GE port is equivalent to four 10GE ports that are configured, and therefore occupies 4 port numbers. For example, if the first virtual sub-switch-board (corresponding to a server blade with a slot number 0) is configured to have one 40GE port and one 10GE port, then the 40GE port occupies port numbers corresponding to 10GE0/0/1 to 10GE0/0/4 and the port numbers 10GE0/0/1 to 10GE0/0/4 are no longer used, and the 10GE port is represented by 10GE0/1/5. Stated differently, the 40GE port and the 10GE port may be respectively represented by 40GE0/0/1 and 10GE0/0/5.

Further, the port configuring unit 11 in the foregoing embodiment of the present disclosure may further be configured to, after receiving configuration instruction information for instructing port configuration on the virtual sub-switch-board, simulate a power-off process of the virtual sub-switch-board to delete original port configuration data of the virtual sub-switch-board; and simulate a power-on process of the virtual sub-switch-board to configure, according to the configuration instruction information, each port of the virtual sub-switch-board. Power-on and power-off processes are simulated for a virtual sub-switch-board on which configuration needs to be performed, so that the configuration on the virtual sub-switch-board takes effect without affecting normal use of a port in another virtual sub-switch-board, thereby meeting a requirement for flexible bandwidth configuration.

Figure 3:
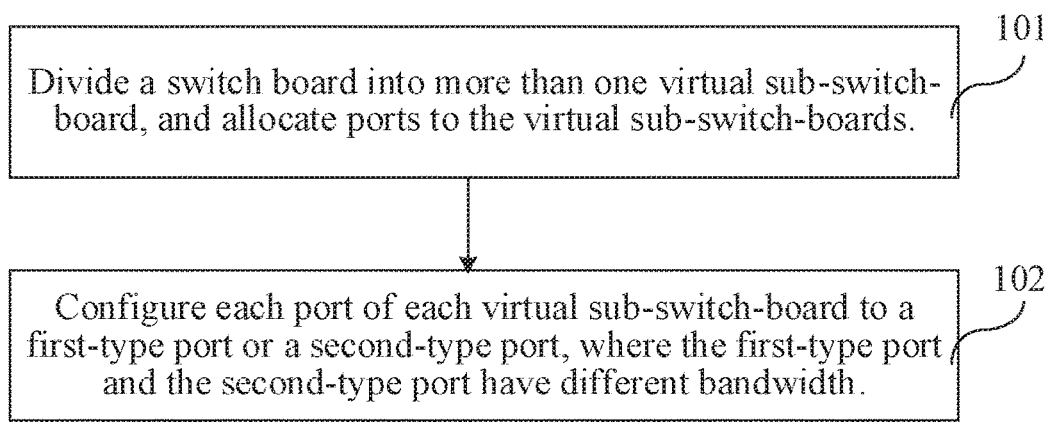
FIG. 3 is a schematic flowchart of a port configuring method of a switch board of a blade server according to an embodiment of the present disclosure.

An embodiment of the present disclosure further provides a corresponding port configuring method. FIG. 3 is a schematic flowchart of a port configuring method of a switch board of a blade server according to this embodiment of the present disclosure. As shown in FIG. 3, the method includes the following steps:

Step 101: Divide the switch board into more than one virtual sub-switch-board, and allocate a port on the switch board to the virtual sub-switch-boards.

Step 102: Configure each port of each virtual sub-switch-board to a first-type port or a second-type port, where the first-type port and the second-type port have different bandwidth.

In the port configuring method provided in this embodiment of the present disclosure, a switch board is divided into more than one virtual sub-switch-board, and each port of the virtual sub-switch-boards is configured to a first-type port or a second-type port within a range of the virtual sub-switch-boards according to a port type requirement corresponding to a specific slot of a server blade, where the first-type port and the second-type port have different bandwidth. Therefore, the switch board in a blade server can perform port configuration according to an actual requirement, so that the switch board has multiple types of ports. Because the port configuration is performed only within a virtual sub-switch-board and a reset operation on the entire switch board is not needed, normal use of a port in another virtual sub-switch-board is not affected, and a requirement for flexible bandwidth configuration is met.

Preferably, the first-type port may be a 10GE port, and the second-type port may be a 40GE port.

Preferably, the dividing the switch board into more than one virtual sub-switch-board in step 101 may be dividing the switch board into more than one virtual sub-switch-board, where the number of virtual sub-switch-boards obtained by division is the same as the number of server blades connected to the switch board.

Further, a port on each virtual sub-switch-board may be identified using a port identifier; the port identifier includes a port type identifier used for identifying that the port is a first-type port or a second-type port, a switch board slot number used for identifying the switch board, a sub-switch-board sequence number used for identifying the virtual sub-switch-board to which the port belongs, and a port sequence number used for identifying a sequence number of the port in the virtual sub-switch-board. Preferably, the sub-switch-board sequence number used for identifying the virtual sub-switch-board to which the port belongs is the same as or corresponds to a slot number of a server blade connected to the virtual sub-switch-board. In this embodiment of the present disclosure, a location and a type of a port are identified using a port identifier; therefore, flexible port bandwidth configuration is implemented, and the location and the type of the port can also be represented conveniently using the port identifier, thereby further facilitating maintenance and management of the switch board.

Further, preferably, configuring each port of each virtual sub-switch-board in step 102 in this embodiment of the present disclosure may further comprise, after receiving configuration instruction information for instructing port configuration on the virtual sub-switch-board, simulating a power-off process of the virtual sub-switch-board to delete original port configuration data of the virtual sub-switch-board; and simulating a power-on process of the virtual sub-switch-board to configure, according to the configuration instruction information, each port of the virtual sub-switch-board. In this embodiment of the present disclosure, power-on and power-off processes are simulated for a virtual sub-switch-board on which configuration needs to be performed, so that the configuration on the virtual sub-switch-board takes effect without affecting normal use of a port in another virtual sub-switch-board, thereby meeting a requirement for a flexible bandwidth configuration.

This embodiment of the present disclosure is described in detail still using the blade server shown in FIG. 2. If the first virtual sub-switch-board has already been configured to have five 10GE ports and a first server blade corresponding to the first virtual sub-switch-board is upgraded to a network adapter supporting 40GE and 10GE, the switch board needs to be instructed to configure one 40GE port and one 10GE port for the virtual sub-switch-board. After receiving configuration instruction information for instructing port configuration on the first virtual sub-switch-board, the port configuring unit of the switch board simulates a power-off process of the virtual sub-switch-board to delete original port configuration data of the virtual sub-switch-board and close all services of a corresponding port. Subsequently, the port configuring unit of the switch board further simulates a power-on process of the virtual sub-switch-board to configure one 40GE port and one 10GE port in the virtual sub-switch-board. It may be determined in advance that first four 10GE ports, namely, ports corresponding to 10GE0/0/1 to 10GE0/0/4, are used to obtain one 40GE port, which is represented by 40GE0/0/1; a port corresponding to 10GE0/0/5 still serves as the 10GE port, which may still be represented by 10GE0/0/5.

In the foregoing embodiments of the present disclosure, the first-type port and the second-type port are described using a 10GE port and a 40GE port as an example. Certainly, a 40GE port and a 100GE port may also be used as an example, where ports corresponding to four 40GE ports may be combined to form one 100GE port, and each port is allocated a bandwidth of 25 Gbps.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A switch board configured to couple to at least one first server blade and at least one second server blade in a blade server, wherein the switch board comprises:
 a plurality of first ports, wherein the first ports are configured to couple the switch board to the first server blade;
 a plurality of second ports, wherein the second ports are configured to couple the switch board to the second server blade; and
 a processor coupled to the first ports and the second ports, wherein the processor is configured to:
  divide the switch board into a first virtual sub-switch-board and a second virtual sub-switch-board;

allocate the first ports to the first virtual sub-switch-board, wherein the first ports have a first bandwidth equivalent to a bandwidth of the first server blade; and allocate the second ports to the second virtual sub-switch-board, wherein the second ports have a second bandwidth equivalent to a bandwidth of the second server blade, and wherein the first bandwidth is different than the second bandwidth.

2. The switch board according to claim 1, wherein a number of virtual sub-switch-boards is the same as a sum of the first server blades and the second server blades.

3. The switch board according to claim 1, wherein each of the first ports and the second ports is identified using a port identifier, wherein the port identifier comprises a sub-switch-board sequence number that is used for identifying the first virtual sub-switch-board or the second virtual sub-switch-board to which each of the first ports or the second ports belong, respectively, and wherein the sub-switch-board sequence number is the same as or corresponds to a slot number of the first server blade or the second server blade coupled to the first virtual sub-switch-board or the second virtual sub-switch-board, respectively.

4. The switch board according to claim 3, wherein the port identifier further comprises one or more of the following: a port type identifier used for identifying each of the first ports and the second ports as a first-type port or a second-type port, respectively, a switch board slot number used for identifying the switch board, or a port sequence number used for identifying a sequence number of the first ports and the second ports in the first virtual sub-switch-board and the second virtual sub-switch-board, respectively.

5. The switch board according to claim 4, wherein the first-type port is a 10 gigabit Ethernet (GE) port, and wherein the second-type port is a 40 GE port.

6. The switch board according to claim 1, wherein the processor is further configured to:
receive configuration instruction information for instructing port configuration on the first virtual sub-switch-board;
simulate a power-off process of the first virtual sub-switch-board to delete original port configuration data of the first virtual sub-switch-board after receiving configuration instruction information for instructing port configuration on the first virtual sub-switch-board; and
simulate a power-on process of the first virtual sub-switch-board to configure, according to the configuration instruction information, each of the first ports of the first virtual sub-switch-board, and
wherein simulating the power-off process and simulating the power-on process does not affect any configuration of the second ports.

7. A port configuring method implemented by a switch board that is coupled to at least one first server blade and at least one second server blade in a blade server, wherein the switch board comprises a plurality of first ports, a plurality of second ports, and a processor coupled to the first ports and the second ports, wherein the first ports are configured to couple the switch board to the first server blade, wherein the second ports are configured to couple the switch board to the second server blade, and wherein the method comprises:
dividing the switch board into a first virtual sub-switch-board and a second virtual sub-switch-board;
allocating the first ports to the first virtual sub-switch-board, wherein the first ports have a first bandwidth equivalent to a bandwidth of the first server blade; and allocating the second ports to the second virtual sub-switch-board, wherein the second ports have a second bandwidth equivalent to a bandwidth of the second server blade, and wherein the first bandwidth is different than the second bandwidth.

8. The port configuring method according to claim 7, wherein a number of virtual sub-switch-boards is the same as a sum of the first server blades and the second server blades.

9. The port configuring method according to claim 7, wherein each of the first ports and the second ports is identified using a port identifier, wherein the port identifier comprises a sub-switch-board sequence number that is used for identifying the first virtual sub-switch-board or the second virtual sub-switch-board to which each of the first ports or the second ports belong, respectively, and wherein the sub-switch-board sequence number is the same as or corresponds to a slot number of the first server blade or the second server blade coupled to the first virtual sub-switch-board or the second virtual sub-switch-board, respectively.

10. The port configuring method according to claim 9, wherein the port identifier further comprises one or more of the following: a port type identifier used for identifying each of the first ports and the second ports as a first-type port or a second-type port, respectively, a switch board slot number used for identifying the switch board, or a port sequence number used for identifying a sequence number of the first ports and the second ports in the virtual first sub-switch-board and the second virtual sub-switch-board, respectively.

11. The port configuring method according to claim 10, wherein the first-type port is a 10 gigabit Ethernet (GE) port, and wherein the second-type port is a 40 GE port.

12. The port configuring method according to claim 7, further comprising:
simulating a power-off process of the first virtual sub-switch-board to delete original port configuration data of the first virtual sub-switch-board after receiving configuration instruction information for instructing port configuration on the first virtual sub-switch-board; and
simulating a power-on process of the first virtual sub-switch-board to configure, according to the configuration instruction information, each of the first ports of the first virtual sub-switch-board.

13. A method, comprising:
dividing a switch board into a first virtual sub-switch-board and a second virtual sub-switch-board, wherein the switch board comprises a plurality of first ports and a plurality of second ports;
allocating the first ports to the first virtual sub-switch-board, wherein the first ports have a first bandwidth equivalent to a bandwidth of at least one first server blade; and
allocating the second ports to the second virtual sub-switch-board, wherein the second ports have a second bandwidth equivalent to a bandwidth of at least one second server blade, and wherein the first bandwidth is different than the second bandwidth.

14. The method according to claim 13, wherein the switch board is coupled to the first server blade and the second server blade in a blade server, wherein the first ports are configured to couple the switch board to the first server blade, and wherein the second ports are configured to couple the switch board to the second server blade.

15. The method according to claim 14, wherein each of the first ports and the second ports is identified using a port identifier, wherein the port identifier comprises a subswitch-board sequence number that is used for identifying the first virtual sub-switch-board or the second virtual sub-switch-board to which each of the first ports or the second ports belong, respectively, and wherein the sub-switch-board sequence number is the same as or corresponds to a slot number of the first server blade or the second server blade coupled to the first virtual sub-switch-board or the second virtual sub-switch-board, respectively.

16. The method according to claim 15, wherein a number of virtual sub-switch-boards is the same as a sum of the first server blades and the second server blades.

17. The method according to claim 16, wherein the port identifier further comprises one or more of the following: a port type identifier used for identifying each of the first ports and the second ports as a first-type port or a second-type port, respectively, a switch board slot number used for identifying the switch board, or a port sequence number used for identifying a sequence number of the first ports and the second ports in the first virtual sub-switch-board and the second virtual sub-switch-board, respectively.

18. The method according to claim 17, wherein the first-type port is a 10 gigabit Ethernet (GE) port, and wherein the second-type port is a 40 GE port.

19. The method according to claim 18, further comprising:
    simulating a power-off process of the first virtual sub-switch-board to delete original port configuration data of the first virtual sub-switch-board after receiving configuration instruction information for instructing port configuration on the first virtual sub-switch-board; and
    simulating a power-on process of the first virtual sub-switch-board to configure, according to the configuration instruction information, each of the first ports of the first virtual sub-switch-board.

\* \* \* \* \*